Jan. 7, 1941.  O. MORGENSEN, JR  2,227,460
AIRPLANE JACK
Filed Dec. 8, 1939
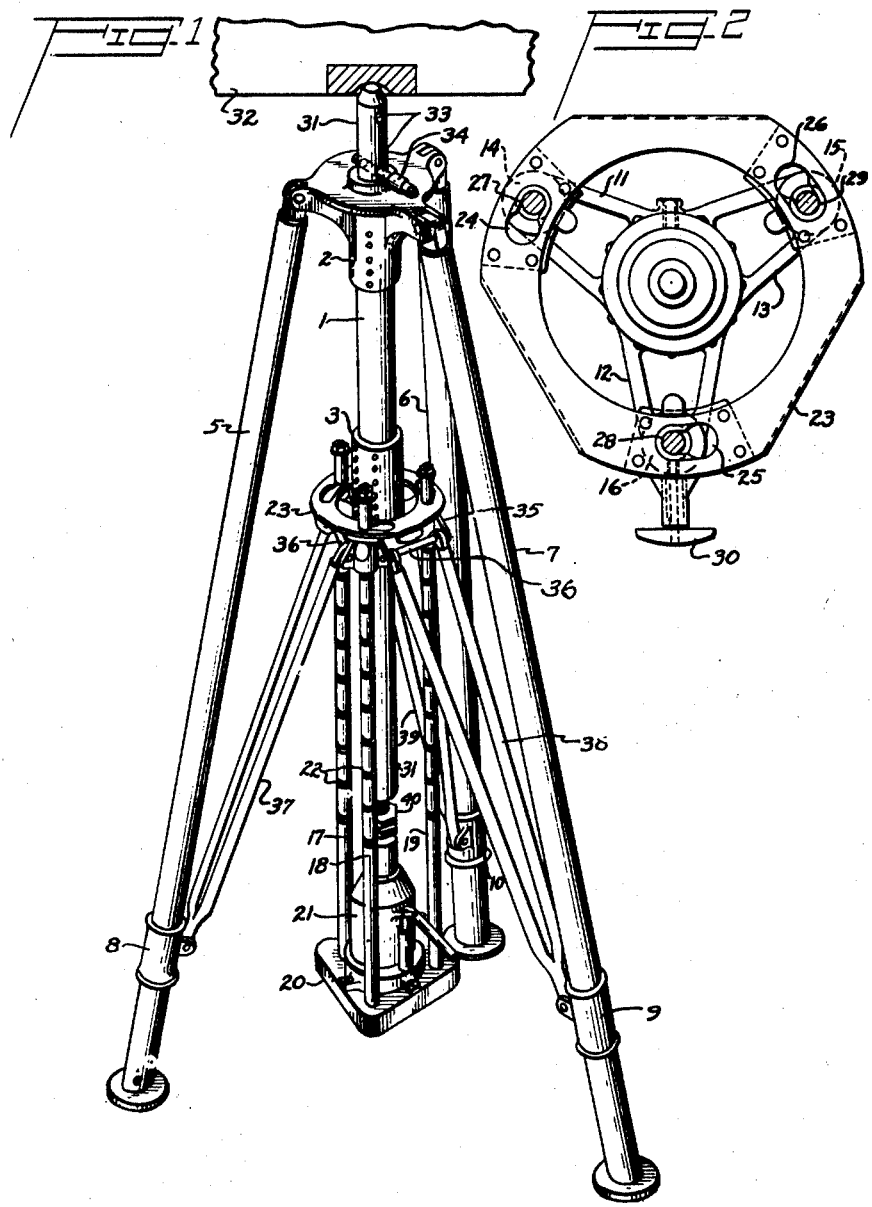
INVENTOR
OTTO MORGENSEN, JR.
BY
ATTORNEYS Patented Jan. 7, 1941

2,227,460

UNITED STATES PATENT OFFICE 2,227,460

AIRPLANE JACK

Otto Morgensen, Jr., Dayton, Ohio

Application December 8, 1939, Serial No. 308,146

15 Claims. (Cl. 254—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a mechanical advantage device for raising, lowering, or moving an object a relatively great distance.

It is an object of this invention to provide a trestle or framework with which an ordinary mechanical advantage means, such as a jack, is used to move an object a greater distance than the normal operative distance of the mechanical advantage means.

It is another object of this invention to provide a framework having supporting elements which are maintained in static equilibrium without being subjected to flexure.

It is a further object of this invention to provide a framework having an object-engaging member slidably carried thereby, a platform adjustably carried by the framework for supporting a mechanical advantage mechanism in operative position with the object- engaging member, and a mechanism for preventing retraction of the object-engaging member to permit retraction of the mechanical advantage mechanism and adjustment of the platform.

It is still another object of this invention to provide a hand-operated device for moving heavy loads relatively long distances without shifting the point of application of the moving force.

In the drawing:

Fig. 1 is a perspective view of the device; and

Fig. 2 is a detailed plan view of the locking collar and associated parts.

The device is made up of a main sleeve-like body member composed of a tube portion 1, an upper hub portion 2, and a lower hub portion 3. The upper hub portion is provided with suitable projecting lugs to which are attached by suitable pins, supporting members or posts 5, 6, and 7. Suitably fastened to the posts near the lower ends thereof are collars 8, 9, and 10, each of which is provided with suitable fastening lugs arranged in a manner and for a purpose to be hereinafter more fully explained. Suitably fastened to the lower hub portion 3 of the main body member are brackets 11, 12, and 13, having journal portions 14, 15, and 16 for slidably receiving rods 17, 18, and 19, which in turn are rigidly attached to a platform 20 for supporting a mechanical advantage means such as a hydraulic jack. If so desired the hydraulic jack may be suitably fastened to the platform 20 by lugs and screws or the like.

Rods 17, 18, and 19 are provided with recessed or turned down portions 22 for cooperation with a locking ring 23, having openings 24, 25, and 26 slightly larger than the outside diameter of rods 17, 18, and 19, and openings 27, 28, and 29 interconnected with the first-mentioned openings and of a size corresponding with the turned down portions 22 of the rods. It is readily appreciated that rotation of the collar 23 in clockwise direction will free rods 17, 18, and 19 for sliding movement permitting raising or lowering of platform 20. The platform may be again locked in adjusted position by aligning a selected trio of recesses 22 with openings 27, 28, and 29 and rotating collar 23 in a counterclockwise direction. Spring-pressed plunger 30, mounted on collar 23, engages suitable recesses in journal 16 for the purpose of holding the collar in adjusted position.

Slidably received in tube 1 and hubs 2 and 3 is a rod 31 constituting a member for engaging an object 32 such as an airplane wing. Member 31 is provided with a plurality of holes 33, spaced approximately half the length of the member, for receiving the pin 34. At the lower end of member 31 there is provided a threaded adjusting member 40 for bringing the member into final adjusted operative relationship with the mechanical advantage means.

Journals 14, 15, and 16 are provided with ears, all of which have been numbered 35, for the reception of bolts 36 for fastening one end of tie rods 37, 38, and 39 to the main body member. The other ends of the tie rods are pin connected to the lugs of collars 8, 9, and 10. Although not shown in the drawing, it is to be understood that the upper end of tie rod 39 is connected to ears 35 on journals 14 and 15 by means of a bolt 36.

In order to obviate bending or flexure of the posts 5, 6, and 7, tie rods 37, 38, and 39 are so arranged with respect thereto that the center lines of a selected post and its tie rod intersect at the bottom of the post to form a closed force diagram. The post members are therefore subjected to compression—except possibly for a small negligible amount of bending between the collars and the bottoms of the posts—and the tie rods to tension forces resulting in the lightest possible weight of structure consistent with load-carrying capacity. The pin connections between the tie rods and collars 8, 9, and 10 are readily removable to permit folding of the device.

The operation of the device is as follows: The device is placed under an object desired to be raised, lowered, or moved—such as the wing 32 of an airplane. Member 31 is raised substantially into operative relationship with respect to the wing or object, if not already in engagement therewith, and held in raised position by pin 34 received in a selected opening 33. Mechanical advantage means 21 is completely retracted and, after being raised with platform 20 into operative relationship with member 31, locking ring 23 is rotated counterclockwise to bring openings 27, 28, and 29 into locking engagement with a selected trio of recesses 22. Mechanical advantage means 21 is operated to move member 31 a distance equal to the maximum operable distance of mechanical advantage means, and pin 34 inserted in the nearest opening 33 to maintain member 31 in the adjusted position. The mechanical advantage means is retracted, the weight of the object being transmitted to the main body member by pin 34. Locking ring 23 is then operated to permit adjustment of platform 20 to again bring the mechanical advantage means in operative relationship with member 31. The operation is repeated until the object is raised, lowered, or moved the desired distance.

Various changes may be made without departing from the spirit or scope of the invention. It is intended to be limited only by the appended claims.

I claim:

1. An airplane jack comprising a sleeve-like body member, supporting posts pivotally connected to said body member, tie rods connecting said body member to said posts adjacent the bottom thereof—said body member supporting posts and tie rods being arranged in such manner that the center lines of the posts and tie rods intersect at substantially the bottom of the posts, an object-engaging member slidably mounted in said body member, mechanical advantage means adjustably carried by said body member in operative relation with said slidable member, and means for holding said slidable member against retraction whereby said mechanical advantage means may be retracted and adjusted with respect to said slidable member.

2. A mechanical advantage device for moving objects a relatively great distance, comprising a sleeve-like body member, diverging supporting elements connected to said body member, tie rods connecting said supporting elements said body member, an object-engaging member concentrically slidably mounted in said sleeve-like member, mechanical advantage means, means adjustably mounted on said sleeve-like member for holding said mechanical advantage means in operative relation with respect to said object-engaging member, and means for holding said object-engaging member in adjusted position to permit retraction of said mechanical advantage means and adjustment of said adjustable holding means.

3. A device as recited in claim 2, in which said holding means comprises slot and pin means.

4. A framework for use in connection with a jack for moving an object a greater distance than the maximum operative distance of the jack, comprising a body member, diverging supporting elements connected to said body member, means for limiting the divergence of said supporting elements, an object-engaging member longitudinally slidably mounted in said body member, means adjustably connected to said body member for supporting said jack in operative relation with said object-supporting member, and means for selectively connecting said slidable member to said body member, whereby said jack may be retracted and said jack-supporting means adjusted with respect to said body member.

5. A jack comprising a framework including a body member, supporting post members connected to said body member, and tie rods connecting said body member to the lower ends of said supporting posts; an object-engaging member carried by and slidably mounted with respect to said framework; mechanical advantage means adjustably carried by said framework and operatively associated with said slidable member; and means for holding said slidable member against retraction to permit retraction of said mechanical advantage means and adjustment thereof with respect to said slidable member.

6. A jack comprising a framework; an object-engaging member carried by and slidably mounted with respect to said framework; mechanical advantage means adjustably carried by said framework and operatively associated with said slidable member, including a platform, mechanical advantage mechanism carried by said platform, rods fixed to said platform and slidably received by said framework, and means releasably locking said rods to said framework; and means for holding said slidable member against retraction to permit retraction of said mechanical advantage means and adjustment thereof with respect to said slidable member.

7. A framework for use in connection with a jack for moving an object a greater distance than the maximum operative distance of the jack, comprising a body member, supporting elements connected to said body member, an object-engaging member longitudinally slidably mounted in said body member, means adjustably connected to said body member for supporting said jack in operative relation with said object-supporting member, means for selectively connecting said slidable member to said body member whereby said jack may be retracted and said jack-supporting means adjusted with respect to said body member, and tie rods connecting the lower end of said posts to said body member in such a manner that the center lines of the posts and tie rods intersect at the bottoms of the posts.

8. A jack comprising a body member, supporting elements connected to said body member, tie rods connecting said supporting elements to said body member, an object-engaging member movably mounted in said body member, and mechanical advantage means operatively associated with said body member for moving said object-engaging member.

9. A device as recited in claim 8 in which each of said tie rods are connected to said body member at a plurality of circumferentially spaced locations.

10. A device as recited in claim 8 in which said body member is centrally located with respect to said supporting elements and tie rods, said object-engaging member is in coaxial alignment with said supporting member and said mechanical advantage means is operatively effective coaxial with said supporting member.

11. An airplane jack comprising a body member, supporting elements, a connection between each of said supporting elements and said body member, tie rods, a connection between one end of each of said tie rods and said body member and a connection between the other end of each of said tie rods and one of said supporting elements, one of said connections being releasable and the other of said connections being pivotal whereby said jack may be collapsed, an object-engaging member slidably mounted in said body member, mechanical advantage means carried by said body member and operatively associated with said slidable member, and means for releasably holding said slidable member against retraction.

12. A jack comprising a tripod, an object-engaging member movably carried by said tripod, and mechanical advantage means operatively associated with said tripod for moving said object-engaging member, said object-engaging member and mechanical advantage means being in coaxial alignment with said tripod.

13. A device as recited in claim 12 in which said tripod includes a body member, supporting elements connected to said body member, and tie rods connecting each of said supporting elements to said body member.

14. A device as recited in claim 12 in which said tripod includes a body member, supporting elements connected to said body member, and tie rods connecting each of said supporting elements to said body member, each tie rod forming with its associated supporting element and said body member a closed force diagram.

15. A jack comprising a supporting member, an object-engaging member movably carried by said supporting member, mechanical advantage means operatively associated with said supporting member for moving said object-engaging member, said object-engaging member and mechanical advantage means being in coaxial alignment with said supporting member, means adjustably carrying said mechanical advantage means on said supporting member, and means for selectively preventing retraction of said slidable member with respect to said supporting member.

OTTO MORGENSEN, Jr.